US006241812B1

(12) United States Patent
Smith et al.

(10) Patent No.: US 6,241,812 B1
(45) Date of Patent: Jun. 5, 2001

(54) ACID-STABLE AND CATIONIC-COMPATIBLE CELLULOSE COMPOSITIONS AND METHODS OF PREPARATION

(75) Inventors: Barbara A. Smith, London (GB); George T. Colegrove; Walter G. Rakitsky, both of San Diego, CA (US)

(73) Assignee: Pharmacia Corporation, St. Louis, MO (US)

( * ) Notice: Subject to any disclaimer, the term of this patent is extended or adjusted under 35 U.S.C. 154(b) by 0 days.

(21) Appl. No.: 09/245,092

(22) Filed: Feb. 5, 1999

Related U.S. Application Data

(63) Continuation-in-part of application No. 09/020,236, filed on Feb. 6, 1998, now abandoned.
(51) Int. Cl.$^7$ .......................... C09D 7/00; C09D 101/02
(52) U.S. Cl. ................................ 106/162.9; 106/162.2; 106/162.8
(58) Field of Search .......................... 106/162.2, 162.8, 106/162.9

(56) References Cited

U.S. PATENT DOCUMENTS

| | | | |
|---|---|---|---|
| 4,144,122 | 3/1979 | Emanuelsson et al. | 162/158 |
| 5,009,797 | 4/1991 | Penny et al. | 252/8.551 |
| 5,019,376 * | 5/1991 | Uick | 424/70 |
| 5,079,162 | 1/1992 | Ben-Bassat et al. | 435/252.1 |
| 5,144,021 | 9/1992 | Arie et al. | 536/56 |
| 5,221,790 * | 6/1993 | Besnard et al. | 536/123 |
| 5,350,528 | 9/1994 | Westland et al. | 252/8.551 |
| 5,362,713 | 11/1994 | Westland et al. | 507/110 |
| 5,366,750 | 11/1994 | Morano | 426/572 |

FOREIGN PATENT DOCUMENTS

| | | | |
|---|---|---|---|
| 0 005 958 | 12/1979 | (EP) | A23G/9/02 |
| 0 537 554 | 4/1993 | (EP) | C08L/1/02 |

OTHER PUBLICATIONS

Chemical Abstracts, vol. 127, No. 24 (Dec. 15, 1997), Abstract No. 330682.

Derwent Publications Ltd., WPI AN 98–014669. (Feb. 1998).

* cited by examiner

*Primary Examiner*—David Brunsman
(74) *Attorney, Agent, or Firm*—Fitzpatrick, Cella, Harper & Scinto

(57) ABSTRACT

Acid-stable and cationic-compatible reticulated bacterial cellulose compositions, containing co-agents and/or cationic surfactants, that are useful rheological modifying agents and stabilizing agents for suspensions, emulsions and foams, and their methods of preparation are disclosed.

13 Claims, No Drawings

ACID-STABLE AND CATIONIC-COMPATIBLE CELLULOSE COMPOSITIONS AND METHODS OF PREPARATION

This application is a continuation-in-part of U.S. patent application Ser. No. 09/020,236, filed Feb. 6, 1998 now abandoned.

BACKGROUND OF THE INVENTION

1. Field of the Invention

This invention relates to acid-stable and cationic-compatible high surface area cellulose compositions that provide enhanced rheology and stability to suspensions, emulsions and foams, and their methods of preparation.

2. Background of the Invention

Sanitizers and disinfectants are a group of cleaning products used in hospital and institutional care, first aid facilities, and in food and agricultural hygiene. In general terms, sanitizers and disinfectants have some bacteriostatic or bacteriocidal properties. Sanitizers are used to reduce the number of living bacteria or viable viral particles on inanimate surfaces, or in water or air. Disinfectants destroy, or irreversibly inactivate bacteria, microbial fungi or viruses. Many of the compounds used as sanitizing and disinfecting agents are cationic surfactants, and many of the formulations used for cleaners, sanitizers and disinfectants are acidic. Typical cleaning additives, including cationic surfactants, form stable compositions, having good flow properties, when formulated in acidic or neutral media.

Cationic surfactants are used in a variety of other applications, for example, as emulsifiers, dispersants, or anti-caking agents. Cationic surfactants have also been used as de-bonding agents and have been added to cellulose pulps before drying to reduce the energy required to separate the dry pulp fibers for use as absorbants, U.S. Pat. No. 4,144,122.

Rheological modifiers or thickeners, such as xanthan and hydroxyethyl cellulose are often used in formulating sanitizers or disinfectants to enhance the aesthetic properties and to improve the ease of application and coating properties, for example, of hard surface cleaners. However, use of these modifiers or thickeners in stabilized sprayable foams and liquids, which remain on the surface upon application, is limited.

Cellulose, particularly reticulated bacterial cellulose has been used to prepare a variety of rheologically modified compositions. For example, U.S. Pat. No. 5,009,797 discloses a mixture of reticulated bacterial cellulose and a gellant, such as guar, hydroxypropyl guar, xanthan, hydroxyethyl cellulose, etc., for use in a high viscosity hydraulic fracturing fluid. U.S. Pat. No. 5,350,528 describes cross-linked fracturing fluids prepared using reticulated bacterial cellulose, a gellant and a cross-linking agent.

Water soluble polymers, such as cellulose derivatives, polyacrylamides or other polysaccharides have been used in combination with reticulated bacterial cellulose to prepare well bore drilling muds, useful for drilling subterranean formations, as disclosed in U.S. Pat. No. 5,362,713.

Non-aqueous, edible compositions of ultrahigh surface area cellulose have been disclosed in U.S. Pat. No. 5,366,750. These compositions were prepared by shearing co-dried mixtures of the cellulose and a chaotropic agent, particularly corn syrup, in a non-aqueous solvent.

However, the formation of stable, aqueous cellulose dispersions is pH dependent. Changing the pH of some of the cellulose compositions, described above, to either acidic or basic compositions, may result in flocculation and separation of the cellulose. The use of cellulose as a rheological modifier or stabilizer for suspensions, emulsions and foams requires the cellulose to form stable compositions, having high viscosity and good flow properties in the presence of cationic components and/or media having acidic or alkaline (basic) pH.

Accordingly, acid-stable and cationic-compatible cellulose compositions that are useful as rheological modifiers for cationic formulations, and particularly as rheological modifiers for sanitizer and disinfectant compositions, would be highly desirable.

SUMMARY OF THE INVENTION

The present invention relates to acid-stable and cationic-compatible high surface area cellulose compositions, and their methods of preparation. Preferably, high surface area cellulose used in the acid-stable and cationic compatible cellulose compositions of this invention is reticulated bacterial cellulose. High surface area cellulose, in combination with at least one cationic co-agent, water, and optionally an acid, provides an acid-stable rheologically modified aqueous composition. In addition, this acid-stable composition may be dried to form dry cellulose compositions that may be effectively re-dispersed in acidic or neutral media. Optionally, the dried acid-stable composition also contains sucrose. Other agents, such as cationic surfactants may be combined with the high surface area cellulose to produce stable rheologically modified suspension, emulsion or foam compositions. Cationic surfactants useful in the present invention include fatty amines, fatty amine salts, or quaternary ammonium compounds. Optionally, at least one cationic-compatible co-agent is combined with the high surface area cellulose and cationic surfactants to produce rheologically modified compositions that are stable in acidic, neutral and/or basic media. The acid-stable and cationic-compatible compositions of this invention may be used as thickeners for cleaners, sanitizers, or disinfectants and may be used in other applications where viscosity and extreme pH stability are required.

DETAILED DESCRIPTION OF THE INVENTION

The acid-stable compositions of this invention are rheologically modified compositions, having an acid pH (pH<7.0), that possess and retain a homogeneous texture and appearance, even on long term storage. The cationic-compatible rheologically modified compositions of this invention possess these features when used in media, or in combination with other elements, having an acid, neutral or basic pH. Generally, the cationic-compatible compositions will be used in an acidic medium.

High surface area cellulose may be used as an effective rheological modifier in the compositions of this invention, which when dispersed in fluids, produces highly viscous, thixotropic mixtures possessing high yield stress. Yield stress is a measure of the force required to initiate flow in a gel-like system. It is indicative of the suspension ability of a fluid, as well as indicative of the ability of the fluid to remain in situ after application to a vertical surface.

The high surface area cellulose useful in this invention may be produced from insoluble cellulose fiber material, by chemical and/or mechanical processes. Typically high surface area cellulose is produced in the form of an dispersion from insoluble cellulose material by successive high energy processing of a mixture of the cellulose in a hydrophilic solvent, such as water, polyhydroxy fluids (e.g., ethylene glycol, glycerin, polyethylene glycol, etc.), or mixtures thereof. This high energy processing is called "activation" and comprises high pressure homogenization and/or high shear mixing. Activation is a process in which the 3-dimensional structure of the cellulose is modified such that the cellulose imparts functionality to the base solvent or solvent mixture in which the activation occurs, or to a composition to which the activated cellulose is added. Functionality includes providing such properties as thickening, imparting yield stress, heat stability, suspension properties, freeze-thaw stability, flow control, foam stabilization, coating and film formation, and the like. The high energy processing that is typically used in the activation process does significantly more than to just disperse the cellulose in base solvent. The high energy processing "teases apart" the cellulose fibers to expand the cellulose fibers. Apparatus that may be useful for activating the high surface area cellulose in water include a Gaulin homogenizer at high pressure, e.g., 8000 psi, Waring blender, Silverson high-shear mixer, Greaves high-shear mixer, a Heidolph propeller mixer, or colloidal mills. Although a single pass homogenization produces activated high surface area cellulose dispersions, preferably, the compositions of this invention may be prepared by passing the cellulose, or a mixture of cellulose and any added agents, through a homogenizer more than once, e.g., three times. Prior to activation, the cellulose material or cellulose and any added agents, may be premixed under low shear conditions, for example, with a Heidolph propeller mixer set at 300 to 350 rpm, to break apart any agglomerated particles. The high surface area cellulose may be used in the form of a wet slurry (dispersion) or as a dried product, produced by drying the dispersion using well-known drying techniques, such as spray-drying or freeze-drying.

A variety of insoluble cellulose materials may be used in this invention, examples of which include plant derived cellulose materials, such as oat fiber and citrus fiber, or bacterially produced cellulose, such as reticulated bacterial cellulose. Preferably, reticulated bacterial cellulose is the cellulose material used as the rheological modifying agent, to viscosity or stabilize the compositions of this invention. The activation of reticulated bacterial cellulose expands the cellulose to create a reticulated network of highly intermeshed fibers with a very high surface area. The activated reticulated bacterial cellulose possesses an extremely high surface area that is at least 200-fold higher than conventional microcrystalline cellulose.

As used herein, the term "reticulated bacterial cellulose" refers to cellulose produced by microorganisms using aerobic culturing techniques and is characterized by a highly reticulated, branching interconnected network of fibers that are insoluble in water. Reticulated bacterial cellulose may be produced by the genus Acetobacter under agitated conditions and is available, under the registered trade name Cellulon®, from the NutraSweet Kelco Company, a unit of the Monsanto Company, St. Louis, Mo.

The preparation of reticulated bacterial cellulose is well known. For example, U.S. Pat. No. 5,079,162 and U.S. Pat. No. 5,144,021, both of which are incorporated by reference herein, disclose a method and media for producing reticulated bacterial cellulose aerobically, under agitated culture conditions, using a bacterial strain of *Acetobacter aceti* var. *xylinum*. Use of agitated culture conditions results in sustained production, over an average of 70 hours, of at least 0.1 g/liter per hour of the desired cellulose. Wet cake reticulated cellulose, containing approximately 80–85% water, can be produced using the methods and conditions disclosed in the above-mentioned patents. Dry reticulated bacterial cellulose can be produced using drying techniques, such as spray-drying or freeze-drying, that are well known.

Acetobacter is characteristically a gram-negative, rod shaped bacterium 0.6–0.8 $\mu$m by 1.0–4 $\mu$m. It is a strictly aerobic organism; that is, metabolism is respiratory, not fermentative. This bacterium is further distinguished by the ability to produce multiple poly $\beta$-1,4-glucan chains, chemically identical to cellulose. The microcellulose chains, or microfibrils, of reticulated bacterial cellulose are synthesized at the bacterial surface, at sites external to the cell membrane. These microfibrils generally have cross sectional dimensions of about 1.6 nm×5.8 nm. In contrast, under static or standing culture conditions, the microfibrils at the bacterial surface combine to form a fibril generally having cross sectional dimensions of about 3.2 nm×133 nm. The small cross sectional size of these Acetobacter-produced fibrils, together with the concomitantly large surface and the inherent hydrophilicity of cellulose, provides a cellulose product having an unusually high capacity for absorbing aqueous solutions. Additives have often been used in combination with the reticulated bacterial cellulose to aid in the formation of stable, viscous dispersions.

The acid-stable cellulose compositions of this invention contain high surface area cellulose and cationic co-agents in an aqueous acid media. Generally, these acid-stable compositions may be prepared by adding at least one cationic co-agent either prior to, simultaneously with, or subsequent to, activation of the cellulose in water. The amount of high surface area cellulose present in the acid-stable compositions of this invention will vary depending on the cellulose material that is used and depending on the desired viscosity of the composition, i.e., as required for a specific use. For example, reticulated bacterial cellulose will typically be present in an amount from about 0.1% to about 1.0% by weight, and preferably about 0.20% to 0.650% by weight of the total weight of the composition. Accordingly, to prepare the compositions of this invention by addition of a co-agent to an activated cellulose dispersion, the aqueous dispersion generally contains reticulated bacterial cellulose in an amount from about 0.1% to about 1.0% by weight, and preferably about 0.2% to 0.8% cellulose by weight of the total dispersion.

Preferably, at least one cationic co-agent is added prior to activation of the cellulose in water, to obtain a well dispersed aqueous admixture of the co-agent and the high surface area cellulose. Cationic co-agents useful in the present invention are typically water-soluble polymers that are capable of interacting with the surface of the high surface area cellulose in a non-covalent manner (i.e., hydrogen bonding with the cellulose). The co-agents may be used to modify the flow behavior of the high surface area cellulose dispersions, act as aids for the high energy dispersion/activation process to improve activation efficiency, to prevent the possibility of flocculation and sedimentation of the cellulose, and to act as a dispersant and re-activation aid for dried materials produced from high surface area cellulose dispersions. The cationic co-agents may be added neat or in solution. Solutions of the cationic co-agent may be prepared by dissolving the co-agent in water, or, if necessary, in aqueous acid solutions. For example, cationic guar and chitosan require acid to dissolve in water. Cationic co-agents may be used in the compositions of this invention to increase the viscosity of the compositions, or may be included to increase the ability of the composition to suspend insoluble additives, such as abrasives used in cleaning formulations. Cationic co-agents that are useful in the present invention must be capable of forming stable aqueous dispersions with high surface area cellulose in an acidic mixture. Co-agents that tend to flocculate or precipitate the cellulose from the dispersion are considered unacceptable. Exemplary cationic co-agents include, but are not limited to, cationic hydroxyethyl cellulose, pre-gelatinized cationic starch, conventional cationic starch, cationic guar, and chitosan. Preferred cationic co-agents are cationic hydroxyethyl cellulose, cationic guar, and chitosan. More preferably, cationic hydroxyethyl cellulose and cationic guar are used. The amount of cationic co-agent contained in the acid-stable aqueous compositions of this invention is from about 0.1% to about 0.8% by weight and preferably 0.2% to about 0.5% by weight of the total weight of the composition.

The high surface area cellulose/cationic co-agent composition of this invention, described above, remains viscous and homogeneous in the presence of acid. The acid component, a protic acid, may be added prior to, simultaneously with, or subsequent to, the dispersion/activation of the cellulose material. Unless prior acidification is required to dissolve the co-agent in water, acid is preferably added after dispersion. The acid may be added neat or in solution. Acids that are solid at room temperature are preferably added in solution, which may be prepared by dissolving the acid in water or other suitable solvent. The acid may be an organic acid or an inorganic acid. Exemplary acids include, but are not limited to, citric acid, acetic acid, formic acid, lactic acid, malic acid, glycolic acid, tartaric acid, nitric acid, hydrochloric acid, sulfuric acid, sulfamic acid, phosphoric acid, oxalic acid and sodium bisulfate. A preferred organic acid is citric acid; a preferred inorganic acid is phosphoric acid. The selection of an acid used to provide the resulting acidic composition having a desired pH may be dependent upon the "strength" of the acid. The acid strength is based upon the dissociation constant, or $pK_a$ value of the acid, wherein the stronger the acid, the smaller the value of $pK_a$. The amount of acid contained in the acid-stable composition of this invention is that amount necessary to decrease the pH of the composition to a desired pH below 7.0, and is typically in an amount of from about 0.1% to about 20%. by weight of the composition.

Another embodiment of this invention is directed to dry, re-hydratable and re-dispersible cellulose compositions of high surface area cellulose and at least one cationic co-agent that may be readily rehydrated or re-activated in water or aqueous solutions (e.g., aqueous acid solutions) using high shear mixing or homogenization, to re-form viscous, homogeneous, acid-stable high surface area cellulose dispersions. Optionally, the dry, re-hydratable cellulose compositions may also contain sucrose.

The aqueous cellulose/co-agent dispersion, prepared as described above, may be dried by techniques common in the art, such as spray drying, drum drying, freeze drying, or tray drying to form a dry powder. In another embodiment of this invention, the aqueous cellulose/co-agent dispersion may be co-dried with sucrose. The dry, re-hydratable and re-dispersible cellulose compositions of this invention will provide acid-stable compositions by mixing or homogenization of the dry composition in aqueous acid solutions or in water, followed by acidification. Cationic guar and chitosan require acid to initially hydrate, thus rehydration in water, alone, of dry compositions containing these co-agents and acid, would provide viscous and homogeneous acid-stable compositions.

The dry compositions of this invention, prepared as described above, contain high surface area cellulose in an amount from about 10% to about 90% by weight, and preferably about 30% to about 70% by weight of the total dry weight of the composition. The dry compositions of this invention contain reticulated bacterial cellulose in an amount from about 40% to about 70% by weight, and preferably about 45% to about 65% by weight of the total dry weight of the composition. The cationic-co-agent is present in the re-hydratable compositions of this invention in an amount of about 10% to about 60% by weight, and preferably about 25% to about 50% by weight of the total dry weight of the composition. Sucrose may be present in the re-hydratable compositions of this invention in an amount of about 0% to about 20% by weight of the total dry weight of the composition.

Another embodiment of this invention includes cationic-compatible cellulose compositions that are stable, homogeneous aqueous dispersions composed of high surface area cellulose, at least one cationic-compatible co-agent and a cationic surfactant. The cationic surfactants included in the compositions of this invention may be used to provide hydrophobic modification of a surface or bacteriocidal properties. Cationic surfactants that are useful in this invention include ammonium compounds derived from fatty amines, such as fatty amine salts and quaternary ammonium compounds.

Fatty amines may contain one to three short chain or long chain alkyl groups, and/or heterocyclic aryl groups attached to a nitrogen atom (an amino group) and have a pH greater than 7.0 (basic). Treatment of fatty amines with acid, produces fatty amine salts which are weakly cationic. Reaction between tertiary fatty amines (those with three hydrophobic groups attached to the nitrogen atom) and alkyl halides produces quaternary ammonium compounds. This reaction, called quaternization, forms a permanently charged species which is stable to variations in pH and may be very water soluble. However, the solubility of fatty acid salts and quaternary ammonium compounds in aqueous systems, or in hydrophobic solvents is dependent upon the size of the molecule, i.e., length and number of hydrophobic chains, relative to the degree of charge on the molecule.

Fatty amines, fatty amine salts, and quaternary ammonium compounds, have the respective generic formulae:

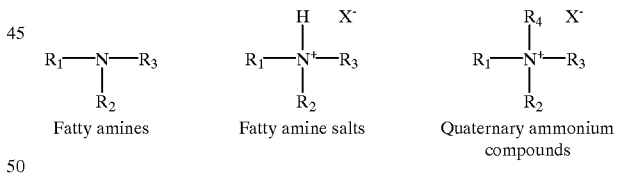

wherein $R_1$–$R_4$ may be the same or different and may be H, alkyl having 1–20 carbon atoms, substituted alkyl having 1–20 carbon atoms, or with N may form a ring, and X is a counter-ion, generally halo. Exemplary substituents include halo, haloalkyl, hydroxyl, alkoxy, amino, alkylamino, carbamoyl, alkoxycarbonyl, cyano, carboxyl, aryl, substituted aryl, heteroaryl and substituted heteroaryl. Typically, at least $R_1$ is an alkyl or substituted alkyl substituent in the fatty amines and fatty amine salts used in the present invention; preferably, $R_1$ and $R_2$ are alkyl or substituted alkyl substituents and more preferably $R_1$, $R_2$ and $R_3$ are alkyl or substituted alkyl substituents. In the quaternary ammonium compounds useful in the present invention, $R_1$, $R_2$, $R_3$, and $R_4$ are alkyl or substituted alkyl substituents.

Generally, the choice of cationic surfactant will be determined by the desired application of the final formulated products. Many of these surfactants are commercially available. However, if desired, fatty amine salts may be generated in situ by treating fatty amines with aqueous acid. As used herein the "cationic surfactant" includes the in situ fatty amine salt formed by combination of a fatty amine and an acid; the chlorinated, brominated and sulphated salts of fatty amines; and the quaternary ammonium derivatives of fatty amines. Exemplary cationic surfactants useful for the preparation of the compositions of this invention include, but are not limited to, the in situ formed salts, the chlorinated salts, the brominated salts, the sulphated salts, and the quaternary ammonium derivatives of amines, wherein the amines have at least one alkyl, aryl or heteroaryl substituent, or which is an aromatic or non-aromatic nitrogen heterocyclic compound. Exemplary amines include primary, secondary, and tertiary amines containing methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, aryl or heteroaryl groups. The amines may contain one or more of these groups or the groups, together with nitrogen, may form a ring, i.e., to form a nitrogen heterocyclic compound which may be-aromatic or non-aromatic. These groups may optionally be substituted with halo, haloalkyl, hydroxy, alkoxy, amino, alkylamino, carbamoyl, alkoxycarbonyl, cyano, carboxyl, aryl, substituted aryl, heteroaryl and substituted heteroaryl groups or may contain one or more sites of unsaturation. Specific examples of useful cationic surfactants include the in situ formed salts, the chlorinated salts, the brominated salts, the sulphated salts, and the quaternary ammonium derivatives of n-dodecylamine, n-tetradecylamine, n-hexadecylamine, n-octadecylamine, tallow amines, hydrogenated tallow amines, imidazolines, oxazolidines, oleamines, tall oil amines, dimethylbenzyl amine, dimethyl dodecyl amine, dimethyl tetradecyl amine, dimethyl hexadecyl amine, dimethyl octadecyl amine, dimethyl behenyl amine, and dimethyl oleyl amine.

The cationic-compatible cellulose compositions of this invention, containing high surface area cellulose, cationic-compatible co-agent, and a cationic surfactant, may be prepared by adding at least one co-agent either prior to, simultaneously with, or subsequent to, dispersing or activating the cellulose in water, followed by addition of a cationic surfactant. The cellulose mixture may be dispersed or activated, using a homogenizer at 1000 to 5000 psi or using a high shear mixer to provide smooth, homogenous dispersions. When using a high shear mixer, the cellulose or cellulose/co-agent mixture is mixed at high speed for sufficient time to provide a smooth and homogeneous dispersion. The amount of high surface area cellulose present in the aqueous cationic-compatible cellulose compositions of this invention will vary depending on the cellulose material that is used and on the desired viscosity of the composition, i.e., as required for a specific use. For example, reticulated bacterial cellulose will typically be present in an amount from about 0.1% to about 1.0% in weight, and preferably about 0.2% to about 0.65% by weight of the total composition.

Cationic-compatible co-agents useful in the present invention are typically water-soluble polymers that are stable in the presence of cationic surfactants and are capable of interacting with the surface of the high surface area cellulose in a non-covalent manner (i.e., hydrogen bonding with the cellulose). The cationic-compatible co-agents must be capable of forming stable dispersions of high surface area cellulose with cationic surfactants under acidic, neutral or basic conditions; co-agents that tend to flocculate or precipitate the cellulose and/or cationic surfactants from the dispersion are considered unacceptable. Preferably, at least one cationic-compatible co-agent is added prior to dispersing/activation of the cellulose in water to obtain a well dispersed aqueous admixture of the co-agent and the high surface area cellulose. Exemplary cationic-compatible co-agents that are useful in any of acidic, neutral or basic compositions include, but are not limited to, cationic hydroxyethyl cellulose, cationic guar, pre-gelatinized and conventional cationic starches, polyacrylamide, and gum tragacanth. Chitosan is also useful as a cationic-compatible co-agent, but this co-agent is only suitable for use in acidic compositions. Co-agents that have been determined to be incompatible with cationic surfactants, and thus unacceptable for use in the present invention are gum arabic, gum karaya, gum ghatti and locust bean gum. Preferred co-agents are cationic hydroxyethyl cellulose, cationic guar, gum tragacanth, and chitosan. More preferably, cationic hydroxyethyl cellulose and cationic guar are used. Gum tragacanth and polymeric quaternary ammonium compounds such as cationic hydroxyethyl cellulose, cationic guar, pre-gelatinized and conventional cationic starches, and polyacrylamide would by suitable for use in compositions having a pH across the entire pH range, but more preferably in the pH range of 2 to 12. Chitosan is suitable for use in compositions having an acid pH (pH<7.0), but more preferably in the pH range of 2 to 5. The cationic-compatible co-agent is present in solution in the aqueous compositions of this invention in an amount typically from about 0.1% to about 0.8% by weight, and preferably about 0.2% to about 0.5% by weight of the composition.

The cationic surfactant, either in solution (with water or a water-miscible solvent) or neat, may be added with low shear mixing to the dispersion of the high surface area cellulose and cationic-compatible co-agent to form aqueous cationic-compatible compositions. If the cationic surfactant and co-agent are both added after dispersion of the cellulose, they may be added to the aqueous cellulose dispersion with low shear mixing, in any order. The aqueous cationic-compatible compositions of this invention contain a cationic surfactant in an amount typically from about 0.05% to about 20.0% by weight, and preferably about 0.1% to about 5.0% by weight of the composition.

The acidic cationic-compatible cellulose compositions composed of high surface area cellulose, at least one cationic-compatible co-agent, a cationic surfactant and an acid, may be prepared by adding the acid component either prior to, simultaneously with, or subsequent to dispersing/activation of the cellulose material in water. Unless prior acidification is required to dissolve the co-agent in water, acid is preferably added after dispersion. If the acid, cationic surfactant and co-agent are all added after dispersion of the cellulose, they may be added with low shear mixing, in any order. Exemplary acids useful in the compositions of this invention are described above. The amount of acid contained in the acidic composition of this invention is that amount necessary to decrease the pH of the aqueous composition to the desired pH below 7.0, and is typically in an amount of from about 0.1% to about 20% by weight of the composition.

Neutral cationic-compatible cellulose compositions of this invention may be prepared by adding a cationic-compatible co-agent subsequent to, or preferably prior to dispersing/activation of the cellulose material in water by high shear mixing or homogenization. Preferably, this embodiment of the invention may be prepared by dispersing the cationic-compatible co-agent with the reticulated bacterial cellulose in water, followed by addition of the cationic surfactant. Exemplary cationic surfactants useful for the preparation of neutral compositions include the chlorinated, brominated and sulphated salts of, and the quaternary ammonium derivatives of the fatty amines described above.

The alkaline, or basic, cationic-compatible cellulose compositions composed of high surface area cellulose, at least one cationic-compatible co-agent, a cationic surfactant and a base, may be prepared by adding the alkaline component, the base, either prior to, simultaneously with, or subsequent to dispersing/activation of the cellulose material in water, but is preferably added after dispersion/activation. The cationic surfactants useful for the preparation of basic compositions are quaternary ammonium compounds that will not be neutralized by change of pH. If the base, cationic surfactant and co-agent are all added after dispersion of the cellulose, they may be added with low shear mixing, in any order. Exemplary bases that may be added to the cellulose dispersion include the alkali and alkaline earth metal salts of bicarbonate, carbonate, hydroxide, phosphate, diphosphate, tripolyphosphate, pyrophosphate, orthosilicate, metasilicate, and the like (e.g., sodium bicarbonate, magnesium phosphate, etc.). The selection of a base used to provide the resulting alkaline composition having a desired pH may be dependent upon the "strength" of the base. The base strength is based upon the dissociation constant, or $pK_a$ value of the conjugate acid of the base ($BH^+$), wherein the smaller the $pK_a$ of the conjugate acid, the weaker is the base (B). The amount of the base contained in the alkaline compositions of this invention is that amount necessary to increase the pH of the aqueous composition to a desired pH above 7.0, and is typically in an amount of from about 0.1% to about 20% by weight of the composition.

In yet another embodiment of this invention, high surface area cellulose may be combined with cationic surfactants, without added co-agents, to form stable, viscous dispersions that are stable at either acidic, neutral or basic pH. Useful cationic surfactants are those described hereinabove. This embodiment may be prepared by dispersing/activating reticulated bacterial cellulose in water, followed by addition of a cationic surfactant. The reticulated bacterial cellulose is present in the resulting aqueous composition in an amount from about 0.1% to about 1.0% by weight, and preferably about 0.2% to about 0.65% by weight of the total composition, and the cationic surfactant is present in the resulting aqueous composition in an amount from about 0.05% to about 20% by weight, and preferably about 0.1% to about 5.0% by weight of the total composition. Optionally, an acid component may be added to acidify the dispersion to a desired pH below 7.0. Exemplary acids useful in the compositions of this invention are described above. The amount of acid contained in the acid-stable composition of this invention is that amount necessary to decrease the pH of the composition to the desired pH below 7.0, and is typically in an amount of from about 0.1% to about 20% by weight of the composition.

Alternatively, a basic component may be added to render the pH of the dispersion alkaline (pH>7.0). Exemplary bases useful for the preparation of the alkaline compositions are described above. The amount of the base contained in the alkaline compositions of this invention is that amount necessary to increase the pH of the aqueous composition to a desired pH above 7.0, and is typically in an amount of from about 0.1% to about 20% by weight of the composition.

Preferably, the compositions of this invention contain reticulated bacterial cellulose, cationic hydroxyethyl cellulose or cationic guar gum, citric acid, and benzalkonium chloride (alkyl dimethyl benzyl ammonium chloride) or reticulated bacterial cellulose, cationic hydroxyethyl cellulose or cationic guar gum, phosphoric acid, and benzalkonium chloride. More preferably, the cellulose compositions contain reticulated bacterial cellulose, cationic guar, citric acid and benzalkonium chloride.

The acid-stable and cationic-compatible cellulose compositions described herein are useful as rheological modifiers for the preparation of a wide variety of products. Therefore, it is anticipated that a wide variety of additives may be used in combination with the compositions of the present invention to prepare stabilized formulations for different applications. For example, household cleaners may contain ethoxylated non-ionic surfactants, chelating agents, such as nitrilotriacetic acid or ethylene diamine tetraacetic acid, and various salts, solvents, perfumes, dyes and pigments. It is anticipated that the cellulose compositions described herein would be useful in a variety of systems containing these additives. Phosphoric acid or phosphoric/nitric acid mixtures may be used to prepare cleaners for the food industry for cleaning and sanitizing metal equipment. Use of a cellulose composition of this invention would provide viscosity and thixotropy to such disinfectants and cleaners and would render these products particularly useful in sprayable foams and for sprayable hard-surface cleaners.

Formulation of rinse-applied fabric conditioners and antistatic finishing agents typically include quaternary ammonium compounds, such as, bis(hydrogenated tallow alkyl) dimethyl ammonium chloride, di-tallow imidazolinium sulphate, or esterified quaternary ammonium compounds, such as N-methyl-N,N-bis($C_{16-18}$-acyloxy)ethyl-(2-hydroxyethyl)ammonium methosulphate. The cellulose compositions of this invention may be used to viscosity these conditioners and may also be used as suspending agents for disperse dyes and as thickeners for jet-printing of basic dyes. The cellulose compositions may also be used to prepare surface-active hair conditioners and foaming hair styling products. Other industrial applications include use of the compositions of this invention as stabilizers or formulating agents for asphalt emulsions, pesticides, corrosion inhibitors in metal working and latex manufacture.

Accordingly, another embodiment of this invention provides a process for forming stabilized compositions, e.g. suspensions, emulsions or foams, by forming a dispersion of a material in water or a water-miscible liquid, wherein the material is a solid, a liquid or a gaseous material, respectively, and mixing the dispersion with a cationic-compatible composition containing a high surface area cellulose, preferably, activated reticulated bacterial cellulose, in water. The cationic-compatible composition is present in the mixture, i.e., the suspension, emulsion or foam, in an amount sufficient to prevent agglomeration or separation of the material therefrom. For example, a stabilized liquid emulsion or foam may be prepared using a cationic-compatible composition of this invention by forming an emulsion of a liquid (e.g., an oil) or air (foam) in water, which may optionally contain a cationic surfactant to aid in formation of the liquid/water emulsion or air/water foam, and mixing the emulsion or foam with a cationic-compatible composition of this invention containing high surface area cellulose, preferably, reticulated bacterial cellulose in water, and optionally containing a cationic-compatible co-agent, a cationic surfactant, and/or an acid or a base, wherein the cationic-compatible composition is used in a sufficient quantity to stabilize and viscosity the emulsion or foam to prevent phase separation of water and/or coalescence of the liquid (e.g. oil).

A stabilized solids suspension may be prepared by mixing a suspension of solid materials in water, with a cationic-compatible composition of this invention containing a high surface area cellulose, preferably reticulated bacterial cellulose. The cationic-compatible composition is used in a sufficient quantity to stabilize and viscosity the suspension to prevent separation of water and/or agglomeration of the solids. The suspension may optionally contain a cationic-compatible co-agent, a cationic surfactant, and/or a base.

For example, an asphalt-water suspension, may be prepared by forming a suspension of hot asphalt solid materials in water, which may optionally contain a cationic surfactant to aid in formation of the solids-water suspension. Mixing an asphalt-water suspension with a cationic-compatible composition of this invention containing reticulated bacterial cellulose in water, and optionally containing a cationic-compatible co-agent, a cationic surfactant, and/or an acid, and adjusting the mixture to pH 2, may provide a solids-suspension of enhanced stability. The cationic-compatible composition is used in a sufficient quantity to stabilize and viscosity the solids-suspension to prevent separation of the water/bitumen emulsion.

The Examples which follow are intended as an illustration of certain preferred embodiments of the invention, and no limitation of the invention is implied. In Examples 3–9, sodium benzoate, which is not considered a necessary component of this invention, was added as a preservative to prevent the growth of mold, etc. on reticulated bacterial cellulose fibers and permit long term evaluation.

EXAMPLE 1

Reticulated bacterial cellulose, in wet-cake form was blended with an aqueous solution of cationic hydroxyethyl cellulose (Ucare Polymer JR-400, sold by Amerchol, Edison N.J.), ratio of bacterial cellulose to co-agent was approximately 3:1, using a Kitchen Aid mixer (Hobart Corp., Troy, Ohio) equipped with a paddle attachment to provide a smooth dispersion, which was dried in a steam tray dryer at 60° C. The resulting dry powder was rehydrated in an aqueous acid solution (phosphoric acid 10% in deionized water) to provide a smooth, homogeneous dispersion having a viscosity of 950 cP at ambient temperature. No lumping or formation of gel particles was observed due to the presence of acid.

EXAMPLE 2

Reticulated bacterial cellulose in wet-cake form and cationic hydroxyethyl cellulose (Ucare Polymer JR-400), in a 2:1 ratio, were added to deionized water and dispersed using a laboratory propeller-type mixer to provide a solution containing 0.3% bacterial cellulose plus 0.15% Polymer JR-400. The resulting mixture was then activated using a common Waring Blender at high speed to provide a viscous, homogeneous dispersion. A cationic surfactant, benzalkonium chloride (1.0% by weight) was added as an 80% solution in ethanol, with stirring, to provide a non-acidified cationic-compatible reticulated bacterial cellulose composition. No flocculation was observed and the resulting dispersion remained homogeneous, smooth and free flowing. The dispersion had a viscosity of 1150 cP at ambient temperature and did not show evidence of reaction or flocculation upon standing for 7 days at ambient temperature. A similar composition prepared using carboxymethyl cellulose as the co-agent showed immediate flocculation upon addition of the cationic surfactant.

EXAMPLE 3

Reticulated bacterial cellulose wet-cake (1.59 parts by weight, 18.83% solids) and sodium benzoate (0.1 parts by weight) were added to deionized water (78.31 parts by weight), with stirring using a paddle stirrer at 300–350 rpm to disperse the solid materials. The resulting mixture was passed three times through a batch extensional homogenizer at 1,000 psi to form an activated dispersion. An acidified, cationic composition was prepared by adding an aqueous solution of citric acid (10 parts by weight of a 10% solution), and an aqueous solution of benzalkonium chloride (10 parts by weight of a 40% solution), by pipette, to the activated dispersion, with stirring (250–300 rpm), to provide a cationic-compatible composition containing 0.3% by weight reticulated bacterial cellulose.

EXAMPLE 4

Pre-gelatinized cationic starch (C Bond 12506, sold by Cerestar U.K. Ltd., Manchester, United Kingdom, 4 parts by weight) was added, with stirring, to a warm (40° C.) solution of sodium benzoate (0.1 parts by weight) in de-ionized water (95.9 parts by weight). Stirring was maintained until a homogeneous solution was obtained. The resulting co-agent solution (5 parts by weight of the 4% solution), reticulated bacterial cellulose wet-cake (1.59 parts by weight, 18.83% solids), and sodium benzoate (0.1 parts by weight) were added, with stirring using a paddle stirrer at 300–350 rpm, to deionized water (73.31 parts by weight) to disperse the solid materials. The resulting mixture was passed three times through a batch extensional homogenizer at 1,000 psi to form an activated dispersion. An aqueous solution of citric acid (10 parts by weight of a 10% solution) and an aqueous solution of benzalkonium chloride (10 parts by weight of a 40% solution) were added to the activated dispersion, with stirring, to provide a cationic-compatible composition containing 0.3% by weight reticulated bacterial cellulose and 0.2% by weight pre-gelatinized cationic starch.

EXAMPLE 5

Sodium benzoate (0.1% by weight) was dissolved in hot (75–80° C.) de-ionized water (97.9 parts by weight), with stirring. To this solution was added cationic hydroxyethyl cellulose (Ucare Polymer JR-400, sold by Amerchol, Edison, N.J., 2 parts by weight) and the resulting mixture was stirred for 1 hour to form a homogenous co-agent solution. This solution was cooled to room temperature (20–25° C.). The resulting co-agent solution (10 parts by weight of the 2% solution), reticulated bacterial cellulose wet-cake (1.59 parts by weight, 18.83% solids), and sodium benzoate (0.1 parts by weight) were added, with stirring using a paddle stirrer at 300–350 rpm, to deionized water (68.31 parts by weight) to disperse the solid materials. The resulting mixture was passed three times through a batch extensional homogenizer at 1,000 psi to form an activated dispersion. An aqueous solution of citric acid (10 parts by weight of a 10% solution) and an aqueous solution of benzalkonium chloride (10 parts by weight of a 40% solution) were added to the activated dispersion, with stirring to provide a cationic-compatible composition containing 0.3% by weight reticulated bacterial cellulose and 0.2% by weight cationic hydroxyethyl cellulose.

EXAMPLE 6

Cationic-compatible compositions containing 0.3% by weight reticulated bacterial cellulose and 0.2% conventional cationic starch (C Bond 05906, sold by Cerestar UK Ltd., Manchester, United Kingdom), were prepared, according to the procedure in Example 5, by substituting conventional cationic starch, in place of cationic hydroxyethyl cellulose.

A 2% co-agent solution containing conventional cationic starch was prepared by dispersing the starch in hot (75–80° C.) de-ionized water, heating to 90° C. for 30 minutes, then cooling to room temperature (20–25° C.) prior to combination with the reticulated bacterial cellulose.

EXAMPLE 7

Cationic-compatible compositions containing 0.3% by weight reticulated bacterial cellulose and 0.2% gum tragacanth (sold by Sigma Aldrich Ltd., Poole, United Kingdom), were prepared, according to the procedure in Example 5, by substituting gum tragacanth, in place of cationic hydroxyethyl cellulose. A 2% co-agent solution containing gum tragacanth was prepared by boiling the gum in de-ionized water for 30 minutes, then cooling to room temperature (20–25° C.) prior to combination with the reticulated bacterial cellulose.

EXAMPLE 8

Cationic guar gum (2% by weight, N-Hance 3000®, Aqualon Co., Houston, Tex.) was added, with stirring, to a solution of sodium benzoate (0.1 parts by weight) in de-ionized water (85 parts by weight). The dispersion was adjusted to pH 7 using citric acid solution (10 parts by weight citric acid dissolved in 90 parts by weight de-ionized water), and stirred for an additional 15 minutes. The solution was again adjusted to pH 7, diluted to 100 parts with de-ionized water, and stirred until homogeneous. The resulting co-agent solution (10 parts by weight of the 2% solution), reticulated bacterial cellulose wet-cake (1.59 parts by weight, 18.83% solids), and sodium benzoate (0.1 parts by weight) were added, with stirring using a paddle stirrer at 300–350 rpm, to deionized water (68.31 parts by weight) to disperse the solid materials. The resulting mixture was passed three times through a batch extensional homogenizer at 1,000 psi to form an activated dispersion. An aqueous solution of citric acid (10 parts by weight of a 10% citric acid solution) and an aqueous solution of benzalkonium chloride (10 parts by weight of a 40% solution) were added to the activated dispersion, with stirring to provide a cationic-compatible composition containing 0.3% by weight reticulated bacterial cellulose and 0.2% by weight cationic guar.

EXAMPLE 9

Sodium benzoate (0.1 parts by weight), and citric acid (10 parts by weight of solid) were sequentially dissolved in boiling de-ionized water (87.9 parts by weight), with stirring. Chitosan (sold by Sigma Aldrich Co. Ltd., Poole, United Kingdom, 2 parts by weight) was dispersed, and dissolved in this solution, with stirring, over a period of 1.5 hours. Un-dissolved chitosan (less than 0.1 parts by weight) was removed by filtering the hot mixture using 100 TW polyester filter material. The solution was cooled to room temperature (20–25° C.), and the water loss brought about by evaporation was replaced with de-ionized water (20–25° C.) to provide a solution that was 87.9 to 88.0% by weight water. The resulting chitosan solution (10 parts by weight of the 1.99 to 2% solution), reticulated bacterial cellulose wet-cake (1.59 parts by weight, 18.83% solids), and sodium benzoate (0.1 parts by weight) were added, with stirring using a paddle stirrer at 300–350 rpm, to deionized water (68.31 parts by weight) to disperse the solid materials. The resulting mixture was passed three times through a batch extensional homogenizer at 1,000 psi to form an activated dispersion. De-ionized water (20 parts by weight) was added by pipette to the activated dispersion, with stirring at 250–300 rpm, to form an acidic cationic-compatible reticulated bacterial cellulose composition. An additional acidified, cationic composition was prepared by adding de-ionized water (10 parts by weight) and an aqueous solution of benzalkonium chloride (10 parts by weight of a 40% solution) to the activated dispersion, with stirring at 250–300 rpm. In both cases, the procedure produced a cationic-compatible composition containing 0.3% by weight reticulated bacterial cellulose and 0.199 to 0.2% by weight chitosan.

Testing

Samples of each of the cationic-compatible reticulated bacterial cellulose compositions were transferred to four storage jars and sealed. Two of the jars were stored at 25° C. and 43° C. for viscosity stability evaluation and two of the jars were stored at 25° C. and 43° C. for visual stability evaluation. Viscosity and yield stress were determined using a Brookfield DV-III programmable rheometer fitted with an LV Guardleg and Brookfield LV Spindle 2L. The duplicate set of samples were visually monitored for precipitation or flocculation, separation, gelation, alteration in air bubble size, and growth of mold or bacteria. The samples were evaluated at 1 hour, 14 days, and 28 days at both 25° C. and 43° C.

The increase in temperature generally had little effect on the initial apparent viscosity of the dispersions. The pH and visual appearance for all of the reticulated bacterial cellulose dispersions were stable during the 28 day evaluation period, at both 25° C. and 43° C. No precipitation or flocculation of the cellulose was observed.

Other variations or modifications, which will be obvious to those skilled in the art, are within the scope and teachings of this invention. This invention is not to be limited except as set forth in the following claims.

We claim:

1. A cellulose composition comprising:
   (i) high surface area cellulose,
   (ii) a cationic surfactant,
   (iii) at least one cationic-compatible co-agent, and
   (iv) water.

2. A cellulose composition according to claim 1, wherein the cellulose is reticulated bacterial cellulose and said cellulose is produced by Acetobacter aceti var. xylinum under agitated culture conditions.

3. A cellulose composition according to claim 2, wherein the cationic surfactant is a fatty amine, a fatty amine salt, or a quaternary ammonium compound.

4. A cellulose composition according to claim 2, wherein the cationic-compatible co-agent is selected from the group consisting of cationic hydroxyethyl cellulose, pre-gelatinized cationic starch, conventional cationic starch, cationic guar gum, gum tragacanth and chitosan.

5. A cellulose composition comprising:
   (i) reticulated bacterial cellulose,
   (ii) cationic guar, and
   (iii) a cationic surfactant selected from the group consisting of benzalkonium chloride, an acid salt, a chlorinated, brominated and sulphated salts, and a quaternary ammonium derivative of n-dodecylamine, n-tetradecylamine, n-hexadecylamine, n-octadecylamine, tallow amines, hydrogenated tallow amines, imidazolines, oxazolidines, oleamines, tall oil amines, dimethylbenzyl amine, dimethyl dodecyl amine, dimethyl tetradecyl amine, dimethyl hexadecyl amine, dimethyl octadecyl amine, dimethyl behenyl amine, and dimethyl oleyl amine.

6. A cellulose composition comprising:

(i) reticulated bacterial cellulose, (ii) cationic hydroxyethyl cellulose, and (iii) a cationic surfactant selected from the group consisting of benzalkonium chloride, the acid salt, the chlorinated, brominated and sulphated salts, or the quaternary ammonium derivatives of n-dodecylamine, n-tetradecylamine, n-hexadecylamine, n-octadecylamine, tallow amines, hydrogenated tallow amines, imidazolines, oxazolidines, oleamines, tall oil amines, dimethylbenzyl amine, dimethyl dodecyl amine, dimethyl tetradecyl amine, dimethyl hexadecyl amine, dimethyl octadecyl amine, dimethyl behenyl amine, and dimethyl oleyl amine.

7. A cellulose composition according to any one of claims 1, 5 or 6, further comprising an acid.

8. A cellulose composition according to claim 7, wherein the acid is selected from the group consisting of citric acid, acetic acid, formic acid, lactic acid, malic acid, glycolic acid, tartaric acid, nitric acid, hydrochloric acid, sulfuric acid, sulfamic acid, phosphoric acid, oxalic acid and sodium bisulfate.

9. A process of preparing a cellulose composition according to claim 1, comprising:

activating a cellulose in water to provide a dispersion of said high surface area cellulose, mixing the cationic-compatible co-agent with the cellulose, either prior to or subsequent to activation of the cellulose, and mixing the cellulose dispersion with the cationic surfactant.

10. A process according to claim 9, wherein said cellulose is reticulated bacterial cellulose.

11. A process of preparing a re-hydratable cellulose composition according to claim 9, wherein the cationic co-agent is mixed with the cellulose prior to activation.

12. A process of preparing a cellulose composition according to claim 9, further comprising adding an acid, either prior to or subsequent to activation of the cellulose.

13. A process of preparing a cellulose composition according to claim 9, further comprising adding a base, either prior to or subsequent to activation of the cellulose.

* * * * *